United States Patent [19]

Boldish et al.

[11] Patent Number: 4,908,191
[45] Date of Patent: Mar. 13, 1990

[54] REMOVING ARSINE FROM GASEOUS STREAMS

[75] Inventors: Steven I. Boldish; Irfan A. Toor, both of Plano, Tex.

[73] Assignee: Ethyl Corporation, Richmond, Va.

[21] Appl. No.: 75,957

[22] Filed: Jul. 21, 1987

[51] Int. Cl.$^4$ .................... B01D 53/34; C01G 28/00
[52] U.S. Cl. .................................. 423/210; 423/617
[58] Field of Search ............... 423/210, 617, 602, 645

[56] References Cited

U.S. PATENT DOCUMENTS

| | | | |
|---|---|---|---|
| 1,509,688 | 9/1924 | Parsons et al. | 423/602 |
| 2,344,895 | 3/1944 | Pearce et al. | 423/602 |
| 2,860,047 | 11/1958 | Reynaud et al. | 423/602 |
| 3,923,478 | 12/1975 | Fiedler | 423/617 |
| 4,532,120 | 7/1985 | Smith et al. | 423/210 |
| 4,801,437 | 1/1989 | Konagaya et al. | 423/210 |

OTHER PUBLICATIONS

Mellor, J. W., "Inorganic & Theoretical Chemistry", vol. IX, p. 54.
Perry et al., "Chemical Engineers' Handbook", Fifth Ed., pp. 86-87, (McGraw-Hill Book Company).

Primary Examiner—Jeffrey E. Russel
Attorney, Agent, or Firm—John F. Sieberth

[57] ABSTRACT

A method and apparatus are described for removing arsine from a gaseous stream such as the gaseous effluent stream from an MOCVD operation in which arsine is employed as an arsenic source. The arsine is burned in the gas phase in the presence of oxygen (air) to form arsenic oxide and a gaseous effluent stream in which all or part of the arsenic oxide is entrained. The arsenic oxide is removed from this stream by washing the same with an aqueous stream thereby forming an aqueous solution of arsenic oxide. At least a portion of this aqueous solution is recirculated to the aqueous spray so that a progressively enriched aqueous solution of arsenic oxide is formed. Periodically an insoluble arsenic containing compound is precipitated from the solution before it becomes saturated with arsenic oxide. Thus, arsine is eliminated from gaseous streams and converted into harmless forms which can be readily handled and disposed of without harm to the environment. At the same time water requirements in the system are kept at a minimum and waste of this resource is reduced.

19 Claims, 1 Drawing Sheet

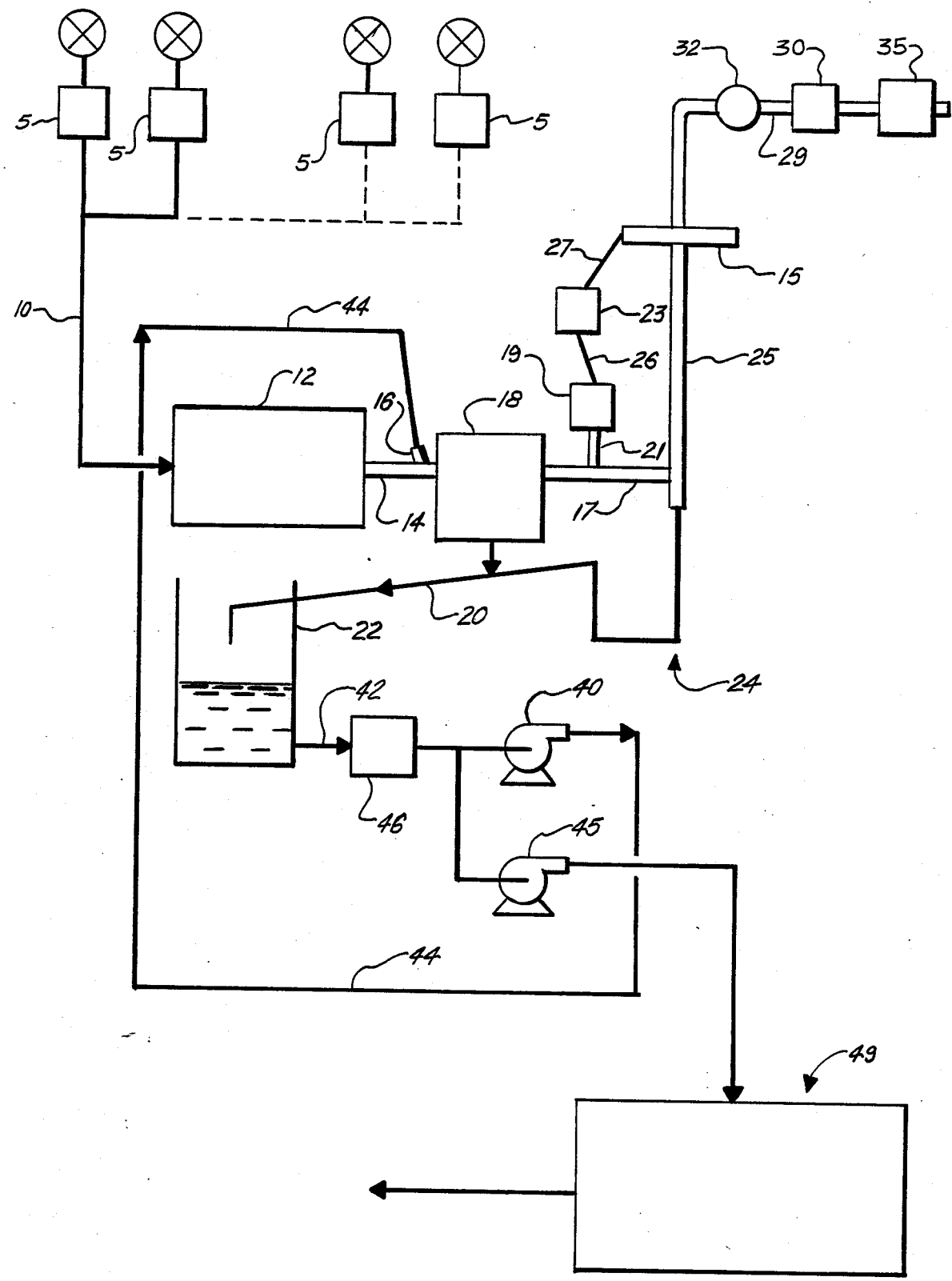

REMOVING ARSINE FROM GASEOUS STREAMS

FIELD

This invention relates to eliminating arsine from gaseous streams encountered in the chemical industry and more particularly to methods and apparatus by which the by-products of such operations are rendered harmless or in a form that can be readily and safely disposed of.

BACKGROUND

Arsine, $AsH_3$, is commonly used in the manufacture of semiconductors and semiconductor devices. For example, arsine, usually entrained in hydrogen as a carrier gas, is used in so-called chemical vapor deposition processes for producing epitaxial coatings on compound semiconductors such as gallium arsenide.

Because arsine is a highly toxic gas, safe handling and disposal of gaseous effluents containing residual arsine is essential.

THE INVENTION

This invention provides methods and apparatus for eliminating arsine from gaseous streams and converting the byproducts of the arsine into harmless forms which can be readily handled and disposed of without harm to the environment.

In accordance with one embodiment of this invention, there is provided a method for removing arsine from a gaseous stream which comprises:

a) burning the arsine in the gas phase in the presence of oxygen to form arsenic oxide and a gaseous effluent stream having entrained therein at least a portion of the arsenic oxide so formed;

(b) removing the arsenic oxide from the gaseous effluent stream by washing the same with an aqueous spray thereby forming an aqueous solution of arsenic oxide;

(c) recirculating at least a portion of said aqueous solution to said aqueous spray and thereby forming a progressively enriched aqueous solution of arsenic oxide; and (d) precipitating an insoluble arsenic-containing compound from at least a portion of the enriched aqueous solution of arsenic oxide before the solution becomes saturated with arsenic oxide.

In order to further improve the efficiency of the operation, it is preferred to recover water from the washed gaseous effluent stream from (b) and to recirculate at least a portion of such recovered water to the aqueous spray. While various methods and systems may be employed for this purpose, the washed gaseous effluent stream from (b) most preferably is subjected at least to demisting and condensation conditions in order to remove water from the moisture-ladened gaseous effluent from (b).

In another embodiment of this invention, there is provided a system for removing arsine from a gaseous arsine-containing stream which comprises:

(a) combustion means for receiving the gaseous arsine-containing stream and burning at least the arsine in air to form arsenic oxide and a gaseous effluent stream having entrained therein at least a portion of the arsenic oxide so formed;

(b) spray means for subjecting said gaseous effluent stream to an aqueous spray to form an aqueous solution of arsenic oxide and a moisture-containing gaseous stream;

(c) means for recirculating at least a portion of said aqueous solution to said spray means;

(d) converter means for converting the arsenic content of at least a portion of said aqueous solution to an essentially water-insoluble arsenic-containing compound; and (e) means for periodically transmitting at least a portion of said aqueous solution to said converter means.

Here again, it is preferable to further improve the efficiency of the system by including in the system means for recovering water from said moisture-containing gaseous stream and for recirculating at least a portion of such recovered water to the aqueous spray. As noted above, the means used for this purpose preferably include demisting apparatus, which most preferably is associated with means for condensing water vapor into liquid water. In a particularly preferred embodiment of this invention discussed hereinafter, there is further included means for removing liquid water from such gaseous stream by means of gravity.

From the above it will be seen that arsine is purged from the initial vapor stream by a combination of combustion to arsenic oxide and water extraction of the arsenic oxide. At least a portion of the arsenic oxide produced during the combustion process is in the form of a fume or dust and is entrained in the gaseous effluent stream leaving the combustion zone. The remainder of the arsenic oxide, if not entrained in this stream, is nonetheless blown along in the conduit carrying the effluent from the combustion zone. The water extraction is effected by blowing a fine spray or mist of water into this gaseous effluent stream from the combustion zone. This insures that both the entrained arsenic oxide and any arsenic oxide being blown along in the conduit are dissolved in the water. The resulting liquid aqueous solution is then separated from the gaseous effluent, preferably by use of a demisting apparatus. To insure complete purge of the arsenic oxide, it is preferred to subject the gaseous effluent stream from the demisting zone to the action of gravity and to condensation conditions so that liquid water (which may contain small quantities of dissolved arsenic oxide) is removed from the moisture laden gaseous effluent leaving the demisting zone. This liquid water from these separation steps is recovered and recirculated to the spraying operation for repeated use. In this way, the content of dissolved arsenic in the water is progressively increased until such time as it reaches a suitably high level below the saturation point. At this stage, the dissolved arsenic content in the water is converted into aninsoluble arsenic containing compound which is readily separated from the residual body of water. Thus the arsine is ultimately converted into an essentially water-insoluble form which can be readily dried and disposed of safely and without harm to the environment.

While it is possible to convert the dissolved arsenic oxide into various insoluble forms, it is preferred to convert it into an insoluble arsenate salt, such as calcium arsenate, lead arsenate, cupric arsenate, ferrous arsenate, ferric arsenate, or the like.

When applied to disposal of arsine-containing gaseous streams from vapor phase epitaxy, the systems of this invention can be readily adapted to handle the effluent from any number of reactors being operated in parallel. Moreover, by utilizing an appropriately designed system such as described hereinafter, crosstalk from one reactor to another is eliminated. Thus the environments within the respective reactors which must be critically controlled, are not disturbed or otherwise interfered with by the system of this invention.

It can also be seen that because of the recirculation of water, this invention makes it possible to conserve this resource which is very scarce in certain parts of this country and indeed in other parts of the world.

And in all cases, it is possible to convert the arsine into a safe and readily handled form.

The above and other embodiments and features of the invention will be still further apparent from the ensuing description, accompanying drawing, and ensuing claims.

BRIEF DESCRIPTION OF THE DRAWING

The FIGURE of the drawing presents a schematic representation of a preferred system of this invention as applied to the elimination of arsine from a plurality of reactors employing arsine in a chemical vapor deposition operation.

DETAILED DESCRIPTION

Referring to the FIGURE, line 10 carries an arsine-containing flow of gas from any desired number of reaction chambers 5,5 in which the arsine is employed. In vapor phase epitaxy, for example, it is common practice to utilize arsine together with hydrogen as a carrier gas in depositing arsenic in or on the desired substrate. Although these operations may be conducted at atmospheric pressure, they are usually run at reduced pressures. Thus the chemical vapor deposition system (CVD system) which includes reaction chambers 5,5 will be isolatable from line 10 by control valves (not shown) so that a given set of pressure conditions can be maintained within the CVD system. In most cases those pressure conditions will differ from the reduced pressure conditions discussed hereinafter under which the vapor train of the disposal system of this invention is operated. Oftentimes CVD systems also include their own vacuum pumps (not shown) to generate reduced pressure conditions within the CVD systems. However, in some instances it may be possible to utilize in the operation of the CVD system the reduced pressure conditions used in the vapor train of the disposal system of this invention.

In any case, the effluent from the reaction chambers themselves (which almost invariably contain residual arsine) may be merged in line 10. The contents of line 10 are introduced into a suitable combustion device or burner 12 in which the combustible materials within the gaseous stream from line 10 are burned in the presence of excess oxygen. (Usually air is employed as the oxygen source in the burner). A number of suitable burners are available on the open market that may be used for this purpose such as CDO 905 available from Innovative Engineering, Inc., Santa Clara, Calif.

Air handling pump 35 downstream in the system continuously applies a moderate vacuum to the entire vapor phase train of the disposal system of this invention including components discussed infra. Any of a variety of pumps or blowers can be used for this purpose, one typical blower for this use being a belt driven blower Model FE18 from The New York Blower Company, Willowbrook, Ill. driven by a 10 hp motor available for example from General Electric Company. The gaseous effluent from pump 35 is vented, preferably through a stack or column (not shown) of suitable height.

The gaseous effluent from burner 12 containing entrained particulate arsenic oxide is carried by line 14 to which is connected spray nozzle 16 for thoroughly washing the gases in line 14 to dissolve out the arsenic oxide. The spray nozzle will usually be operated under a sufficient pressure (e.g., 60 to 80 psig) to produce a fine spray. Spray heads with orifices in the range of 3 to 10 mils are suitable for this purpose. In the system depicted, the moisture-laden gases are subjected to three operations for removing the moisture (and the dissolved arsenic oxide). First, the gas flows through demister 18 which preferably is of cyclonic design such as available from Wright Austin Company, Detroit, Mich. Demister 18 normally removes most of the arsenic-containing water and transfers it via drain line 20 to recirculation tank 22. Next the wet flow of gas is fed by line 17 perpendicularly into a vertical column 25, the bottom of which is equipped with a p-trap 24 leading to drain line 20. In this way, arsenic-containing mist not removed by demister 18 tends to fall under the influence of gravity toward p-trap 24 for collection in tank 22. To assist in this gravity separation, the inner diameter of Column 25 (e.g., 3 to 4 inches) is larger than the inner diameter of line 17 (e.g., 2 to 3 inches) so that the velocity of the wet gas is reduced on leaving line 17 and entering column 25. As can be appreciated from the Drawing, the body of water contained in the U-shaped p-trap insures that gases flowing in line 17 and column 25 will not exit via line 20. Thirdly, any water vapor still remaining in the gas stream is condensed on the walls of column 25, which serves as an air-cooled condenser, and falls by gravity into p-trap 24 and thence to tank 22 via drain line 20. To this end, column 25 should be of suitable length to allow such condensation to occur. An air-cooled column rising 20 feet with an inner diameter of 3 inches has been found highly satisfactory for this purpose, but of course, the dimensions will be governed by a number of factors, including gas velocity, moisture content, and prevailing ambient temperature. If desired, chilled air may be blown onto column 25. Likewise, condensation in column 25 may be enhanced by equipping the column with fins or by jacketing the column with a flow of cold water.

Column 25 is preferably operated under a moderate back pressure of between about −1 inch to about −2 inches of water to ensure that vacuum pump exhaust from reactors 5,5 remains at a negative pressure and that the back pressure does not affect the pumping speed of the pumps (not shown) in the chemical vapor deposition train. It will be appreciated that since column 25 is under a reduced or negative pressure, the other components in the vapor train of the disposal system of this invention (commencing at line 10 and including burner 12, demister 18, and lines 14 and 17) will also be operated at a reduced or negative pressure. By use of this moderate back pressure within the vapor train of the disposal system of this invention, crosstalk between reactors 5,5 (wherein uniformity of gas composition is often essential) is eliminated and water is not retained in demister 18 but rather is readily drained therefrom into drain line 20. It will be appreciated that if the pressure in the system becomes too positive, gas would be expelled through demister 18, and the vacuum pumps in the vapor deposition train would load down and could not control the pressure of the reactors 5,5. Conversely, if the system were to go too negative, water would be accumulated by the system.

To achieve the desired back pressure, the preferred system depicted includes a capacitance manometer 19 (also known as a differential pressure gauge) connected to line 17 by means of a small conduit 21, an electronic controller 23 adapted to receive electrical signals from manometer 19 via wire or connector 26, and in column 25 a butterfly valve 15 operated by electrical signals from controller 23 carried by wire or connector 27. Manometer 19 continuously senses the pressure inside line 17 relative to atmospheric pressure and translates the pressure readings to electrical signals which are transmitted to controller 23. The controller in turn senses the difference between the voltage of the incoming electrical signals from the manometer and a preselected constant voltage, and in response to this difference continuously transmits a signal to butterfly valve 15 to adjust the opening therein to the extent necessary to null out the signal being transmitted via wire 27 and thereby keep the internal pressure in the system at a preselected constant reduced pressure. Typical components of this system, each available from MKS Instruments, Inc., Richardson, Texas, are as follows:

Capacitance Manometer 19 —Model 223BD-00010/AAUSP 27–83

Controller 23, an electronic package Model No. 252A-1-VPO

Butterfly Valve 15 —a fast responding throttle valve Model No. 253A-3-3-2/SP 21–84.

After the water has been removed from the gas stream flowing through demister 18, line 17, and column 25, the dried gas is passed through scrubber 30 containing an adsorbent material such as activated carbon and then vented to the atmosphere. To ensure that arsine is not inadvertently vented to the atmosphere, sensing apparatus 32 may be installed in vent line 29 to either set off an alarm or activate controls (not shown) to automatically shut down the entire system.

Contents of recirculation tank 22 are continuously recirculated to spray nozzle 16 by means of recirculating pump 40 and lines 42 and 44. A one mil filter 46 is preferably installed in line 42 to trap out any solids that might plug up or otherwise impair the operation of nozzle 16.

The recirculation of the water from tank 22 to nozzle 16 results in a progressive increase in the concentration of arsenic oxide dissolved in the water. However, since the aqueous solution of arsenic oxide initially formed is well below the saturation point, the water used in the system can be reutilized for a considerable period of time before it is subjected to further treatment. This in turn is of considerable advantage in that water, which is precious in certain areas of the country, is conserved and waste of this resource is minimized.

Accordingly, when the concentration of the arsenic oxide in the water in tank 22 reaches a suitable elevated level (but below saturation), at least a portion of the contents of tank 22 is pumped by transfer pump 45 to treating system 49 which may be of various types. For example, it may comprise a series of chambers or tanks, the first of which may be a mere holding tank. The solution may then be pumped to a second chamber or tank where the treatment to convert the dissolved arsenic oxide to an essentially water-insoluble form is initiated by adding an oxidizing agent such as sodium or calcium hypochlorite bleach or the like to change trivalent arsenic ions to pentavalent arsenic ions. Thereupon, a suitable salt is introduced into the solution to cause precipitation of an insoluble arsenate such as calcium arsenate, lead arsenate, cupric arsenate, ferric arsenate or the like. Any of a variety of salts can be used for this purpose, such as the chlorides, nitrates and the like. In practice, use of ferric chloride has been found particularly advantageous. Precipitation of the insoluble arsenate such as ferric arsenate may be facilitated by use of a conventional filter aid, such as an ionic polymer. The wet precipitate is then pumped into a drum or other vessel (not shown) where it is decanted and dried. All water used in these treating operations may then be passed through a scrubber of absorbent material such as activated alumina. This water may then be recycled to tank 22 for reuse in the spraying operation or it may be discarded or put to other use such as irrigation.

Equipment which may be used in treating system 49 is available on the open market, for example from Wastewater Treatment Systems, Campbell, Calif.

It is thought that the invention and many of its attendant advantages will be understood from the foregoing description and it will be apparent that various changes may be made in the form, construction, and arrangement of the parts without departing from the spirit and scope of this invention, the forms hereinbefore described being merely preferred embodiments thereof.

We claim:

1. A method for removing arsine from a gaseous effluent stream which comprises:
   (a) burning the arsine in the gaseous effluent stream in the presence of oxygen to form arsenic oxide and a gaseous discharge stream having entrained therein at least a portion of the arsenic oxide so formed;
   (b) removing the arsenic oxide from the gaseous effluent stream by washing the same with an aqueous spray thereby forming an aqueous solution of arsenic oxide and an essentially arsenic-free moisture-containing gaseous stream;
   (c) recovering water from said moisture-containing gaseous stream to form a drier gaseous effluent stream;
   (d) maintaining said effluent stream, said discharge stream, said moisture-containing gaseous stream and said drier gaseous effluent stream under a pressure of $-1$ to $-2$ inches of water;
   (e) recirculating at least a portion of said aqueous solution to said aqueous spray and thereby forming a progressively enriched aqueous solution of arsenic oxide; and
   (f) precipitating an insoluble arsenic-containing compound from at least a portion of the enriched aqueous solution of arsenic oxide before the solution becomes saturated with arsenic oxide.

2. A method of claim 1 further characterized by recirculating at least a portion of the recovered water from (c) to the aqueous spray.

3. A method of claim 1 further characterized by recovering water from said moisture-containing gaseous effluent stream at least by demisting and condensing water therefrom.

4. A method of claim 3 further characterized by recirculating at least a portion of such recovered water to the aqueous spray.

5. A method of claim 1 further characterized by employing air as the oxygen source in (a).

6. A method of claim 1 further characterized by precipitating a water-insoluble arsenate as the insoluble arsenic-containing compound in (f).

7. A method of claim 1 further characterized by treating at least a portion of the enriched aqueous solution of arsenic oxide with an oxidizing agent and thereafter introducing ferric chloride into the so-treated solution whereby in (f) ferric arsenate is precipitated as the insoluble arsenic-containing compound.

8. A method of claim 7 further characterized by employing a hypochlorite as the oxidizing agent.

9. In a process in which a gaseous stream containing arsine is subjected to thermal decomposition and in which a gaseous effluent stream containing residual quantities of arsine is formed, the improvement pursuant to which the residual quantities of arsine are removed from such effluent stream and the arsenic content thereof is transformed into a disposable solid form, said improvement comprising:
   (a) mixing the effluent stream with air and subjecting the mixture to combustion in a combustion zone to form a gaseous discharge stream containing particulate arsenic oxide;
   (b) subjecting said discharge stream to an aqueous spray and thereby forming an aqueous solution of arsenic oxide and an essentially arsenic-free moisture-containing gaseous stream;
   (c) recovering water from said essentially arsenic-free moisture-containing gaseous stream to form a drier gaseous effluent stream;
   (d) maintaining said effluent stream, said discharge stream, said moisture-containing gaseous stream and said drier gaseous effluent stream under a pressure of $-1$ to $-2$ inches of water;
   (e) recirculating at least a portion of said aqueous solution to said aqueous spray and thereby forming a progressively enriched aqueous solution of arsenic oxide; and
   (f) converting the arsenic content of at least a portion of said aqueous solution to an essentially water-insoluble arsenic-containing compound before the solution becomes saturated with arsenic oxide.

10. The improvement of claim 9 further comprising recirculating at least a portion of such recovered water to the aqueous spray.

11. The improvement of claim 9 further comprising recovering water from said essentially arsenic-free moisture-containing gaseous stream at least by demisting and condensing water therefrom.

12. The improvement of claim 11 further comprising recirculating at least a portion of such recovered water to the aqueous spray.

13. The improvement of claim 10 further comprising passing said drier gaseous effluent stream through an absorbent medium to ensure that any residual arsine contained in said stream is purged therefrom.

14. A system for removing arsine from a gaseous arsine-containing stream which comprises:
   (a) combustion means for receiving the gaseous arsine-containing stream and burning at least the arsine in air to form arsenic oxide and a gaseous effluent stream having entrained therein at least a portion of the arsenic oxide so formed;
   (b) spray means for subjecting said gaseous effluent stream to an aqueous spray to form an aqueous solution of arsenic oxide and a moisture-containing gaseous stream;
   (c) means for recirculating at least a portion of said aqueous solution to said spray means;
   (d) converter means for converting the arsenic content of at least a portion of said aqueous solution to an essentially water-insoluble arsenic-containing compound;
   (e) means for periodically transmitting at least a portion of said aqueous solution to said converter means; and
   (f) means for maintaining said system under a substantially continuous reduced pressure.

15. Apparatus according to claim 14 further comprising means for recovering water from said moisture-containing gaseous stream and for recirculating at least a portion of such recovered water to the spray means.

16. Apparatus according to claim 15 in which the means for recovering water from said moisture-containing gaseous stream includes demisting apparatus.

17. Apparatus according to claim 16 in which the means for recovering water from said moisture-containing gaseous stream additionally includes means for condensing water vapor into liquid water.

18. Apparatus according to claim 17 in which the means for recovering water from said moisture-containing gaseous stream additionally includes means for removing liquid water from such gaseous stream by means of gravity.

19. Apparatus according to claim 15 further including means for ensuring that any residual arsine contained in the gaseous stream from which the water has been recovered is purged from said stream before discharge.

* * * * *